US007668815B2

(12) United States Patent
Hild et al.

(10) Patent No.: US 7,668,815 B2
(45) Date of Patent: Feb. 23, 2010

(54) INTEGRATING BROWSER-INCOMPATIBLE INFORMATION INTO WEB CONTENT AND DISPLAYING THE INFORMATION ON A COMPUTING DEVICE OF A BROWSER ENVIRONMENT

(75) Inventors: Stefan G. Hild, Somers, NY (US); Veronique Perret, Saint-Blaise (CH)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 10/981,357

(22) Filed: Nov. 4, 2004

(65) Prior Publication Data

US 2005/0120007 A1 Jun. 2, 2005

(30) Foreign Application Priority Data

Nov. 17, 2003 (EP) .................................. 03405815

(51) Int. Cl.
*G06F 17/30* (2006.01)
(52) U.S. Cl. ........................................................ 707/4
(58) Field of Classification Search ................... 707/102
See application file for complete search history.

(56) References Cited

U.S. PATENT DOCUMENTS

| 6,418,462 | B1 * | 7/2002 | Xu ............................. 709/201 |
| 6,865,599 | B2 * | 3/2005 | Zhang ......................... 709/218 |
| 7,000,180 | B2 * | 2/2006 | Balthaser .................... 715/240 |
| 7,069,267 | B2 * | 6/2006 | Spencer, Jr. .................. 707/10 |
| 7,117,504 | B2 * | 10/2006 | Smith et al. .................. 719/328 |
| 7,133,872 | B2 * | 11/2006 | Edwards et al. ............. 707/100 |
| 7,404,189 | B2 * | 7/2008 | Benedetti .................... 719/317 |
| 2002/0099738 | A1 * | 7/2002 | Grant ......................... 707/513 |
| 2003/0105887 | A1 * | 6/2003 | Cox et al. .................... 709/328 |
| 2003/0135509 | A1 * | 7/2003 | Davis et al. ................. 707/100 |
| 2003/0164852 | A1 * | 9/2003 | Simpson et al. ............. 345/748 |
| 2004/0039797 | A1 * | 2/2004 | Simpson et al. ............. 709/219 |

(Continued)

OTHER PUBLICATIONS

"Understanding SOAP" by Aaron Skonnard. Mar. 2003. Available online at http://msdn.microsoft.com/en-us/library/ms995800.aspx.*

(Continued)

*Primary Examiner*—Neveen Abel Jalil
*Assistant Examiner*—Mark Andrew X Radtke
(74) *Attorney, Agent, or Firm*—Scully, Scott, Murphy & Presser, P.C.; Kenneth R. Corsello, Esq.

(57) ABSTRACT

The present invention provides methods, systems and apparatus for integrating browser-incompatible information in a Web content file and for displaying the information on a computing device of a browser environment. A Web content providing means is capable of providing the Web content file, and performs the following steps: receiving the Web content file that comprises an element having a remote procedure call (RPC) request generating instruction for generating an RPC request from the browser environment; interpreting the Web content file for displaying on the browser environment; interpreting the RPC request generating instruction to generate the RPC request; transmitting the RPC request to a data server indicated in the RPC request generating instruction of the element; receiving response data from the data server; and modifying the displaying of the Web content file on the browser environment by the response data.

18 Claims, 5 Drawing Sheets

U.S. PATENT DOCUMENTS

| | | |
|---|---|---|
| 2004/0044656 A1* | 3/2004 | Cheenath ........................ 707/3 |
| 2004/0068586 A1* | 4/2004 | Xie et al. ..................... 709/246 |
| 2005/0021502 A1* | 1/2005 | Chen et al. ..................... 707/2 |
| 2005/0120007 A1* | 6/2005 | Hild et al. ....................... 707/3 |
| 2006/0184661 A1* | 8/2006 | Weisman et al. ............ 709/224 |
| 2007/0214420 A1* | 9/2007 | Guertler et al. ............. 715/742 |

OTHER PUBLICATIONS

Curbera, F.; Duftler, M.; Khalaf, R.; Nagy, W.; Mukhi, N.; Weerawarana, S., "Unraveling the Web services web: an introduction to SOAP, WSLD, and UDDI," Internet Computing, IEEE , vol. 6, No. 2, pp. 86-93, Mar./Apr. 2002.*

"HTTPRequest-enabled RS" by Adam Machanic. Jun. 18, 2002. Posted to microsoft.public.scripting.remote newsgroup.*

"Using the XML HTTP Request object" by Jim Ley. Published Apr. 2002. Available online at http://www.jibbering.com/2002/4/httprequest.2002.html.*

"Remote Scripting" by Andrew Clinick. Apr. 12, 1999. Available online at http://msdn.microsoft.com/en-us/library/ms974566.aspx.*

"Microsoft Computer Dictionary, Fifth Edition" Chapter P. May 1, 2002.*

"Using the XML HTTP Request object" by Jim Ley. Published Jan. 2006. Available online at http://www.jibbering.com/2002/4/httprequest.html.*

* cited by examiner

```
POST /StockQuote HTTP/1.1
Host: www.stockquoteserver.com
Content-Type: text/xml; charset="utf-8"
Content-Length: nnnn
SOAPAction: "Some-URI#serviceName"

<SOAP-ENV:Envelope xmlns:SOAP-ENV="
http://schemas.xmlsoap.org/soap/envelope/"
     SOAP-ENV:encodingStyle="http://schemas.xmlsoap.org/soap/encoding/">
     <SOAP-ENV:Body>
          <m:GetLastTradePrice xmlns:m="Some-URI">
               <symbol>DIS</symbol>
          </m:GetLastTradePrice>
     </SOAP-ENV:Body>
</SOAP-ENV:Envelope>
```

Fig. 3

```
HTTP/1.1 200 OK
Content-Type: text/xml; charset="utf-8"
Content-Length: nnnn <SOAP-ENV:Envelope xmlns:SOAP-ENV="
http://schemas.xmlsoap.org/soap/envelope/"
     SOAP-ENV:encodingStyle="http://schemas.xmlsoap.org/soap/encoding/"/>
     <SOAP-ENV:Body>
          <m:GetLastTradePriceResponse xmlns:m="Some-URI">
               <Price>34.5</Price>
          </m:GetLastTradePriceResponse>
     </SOAP-ENV:Body>
</SOAP-ENV:Envelope>
```

Fig. 4

```
<FORM METHOD="post" ACTION="service_url" enctype="text/xml"
soapAction="url#serviceName">
```

Fig. 5

```
POST service_url HTTP/1.1
Content-Type: text/xml; charset="utf-8"
Content-Length: nnnn
SOAPAction: "Some-URI#serviceName"
```

Fig. 6

```
<!-- SOAP_TEMPLATE
     <SOAP-ENV:Envelope  xmlns:SOAP-ENV="
http://schemas.xmlsoap.org/soap/envelope/"
     SOAP-ENV:encodingStyle="http://schemas.xmlsoap.org/soap/encoding/">
     <SOAP-ENV:Body>
          <m:GetTemperature xmlns:m="Some-URI">
               <zip></zip>
          </m:GetTemperature>
     </SOAP-ENV:Body>
</SOAP-ENV:Envelope>
-->
```

Fig. 7

```
<HTML><BODY>
The temperature in your area is 70
</BODY></HTML>
```

Fig. 8

INTEGRATING BROWSER-INCOMPATIBLE INFORMATION INTO WEB CONTENT AND DISPLAYING THE INFORMATION ON A COMPUTING DEVICE OF A BROWSER ENVIRONMENT

FIELD OF THE INVENTION

The present invention is related to a method for integrating browser-incompatible information into Web content and for displaying the information on a computing device of a browser environment. Furthermore, the present invention is related to a browser environment having a standard browser computing device for displaying Web content.

BACKGROUND OF THE INVENTION

For exchanging data via networks, particularly via the Internet, data protocols are being used to control the data flow. One new protocol that is currently being widely adapted throughout the industry is "SOAP", i.e. "Simple Object Access Protocol". Although the "SOAP" protocol is layered on top of HTTP, it is not primarily intended for direct use from within a browser environment but instead is a generic HTTP tunneled RPC (remote procedure call) mechanism to be used, for example, from within a programming environment such as a Java virtual machine which may be invoked through the browser environments through servlets.

In fact, current Web browser environments are not capable of sending or receiving SOAP messages from a Web page. Therefore, it is necessary to use Java Applets, JavaScript, Plug-ins or Active X components in order to handle SOAP messages. While this is may be acceptable in a common desktop environment, it is unacceptable for Web browsers on simple devices, such as Palm Pilots or cell phones.

In particular, three problems can be identified with the current behavior of standard Web browsers with regard to SOAP in such environments; namely the required SOAP header fields that are not commonly used or generated by Web browsers, the encoding of the SOAP request itself, which is unlike those requests generated by Web browsers, and the generation of markup content from the SOAP response that can be displayed in the browser.

The world wide Web includes a number of servers hosting HTTP (hypertext transfer protocol) accessible data which can be transmitted to client programs (i.e. Web browsers), utilizing the hypertext transfer protocol via an Internet protocol (IP) connection between a client device and a server hosting device. As the data stored on the servers has to be in a specific format to be displayed (for example, the format known as the hypertext markup language—HTML), other data available on the server cannot be displayed in a browser environment without additional means.

It is therefore an objective of the present invention to enable Web browsers for simple portable or mobile devices to generate SOAP messages and to mark up SOAP responses and thus, enable them to include the increasing number of SOAP-accessible contents available via the Internet.

SUMMARY OF INVENTION

These and other objectives of the present invention are provided by the method and the browser environment for integrating browser-incompatible information into Web content and for displaying the information on a computing device of a browser environment. The Web content can be provided by a Web content providing means, as commonly used throughout the world wide Web. Upon receiving a Web content including an element having a remote procedure call (RPC) request generating instruction for generating an RPC request from the browser environment a Web content file is interpreted for displaying on the browser environment. Furthermore, the RPC request generating instruction is interpreted to generate the RPC request. The RPC request is then transmitted to a data server indicated in the RPC request generating instruction of the element. Response data is received from the data server and the displaying of the Web content file is modified on the browser environment by the response data.

In some embodiments, the Web content includes hypertext markup language HTML information. Furthermore, the RPC request generating instruction is a SOAP request generating instruction and the RPC request is generated as a SOAP request.

According to another aspect of the present invention, a browser environment having a standard browser computing device for displaying a Web content file is provided. The browser environment further comprises Web content interpreting means for interpreting the Web content file and for displaying it. An RPC request interpreting means is provided for interpreting a remote procedure call (RPC) request generating instruction to generate RPC request data. The RPC request data are transmitted to a data server indicated in the RPC request generating instruction by transmitting means. The result of a function, e.g. a database query, executed at the data server is retrieved by retrieving means wherein the function is indicated in the RPC request generating instruction.

It some embodiments, the SOAP request interpreting means is operable to interpret the SOAP request generating instruction wherein the SOAP request generating instruction is included in an HTML "FORM" tag in the Web content file having attributes which indicate an URL of the data server, a function to be performed at the data server, and an encoding type of the response data.

DESCRIPTION OF THE DRAWINGS

FIG. 3 shows an exemplary SOAP header that invokes the SOAP function;

FIG. 4 shows a SOAP response from a data server sending back results of the SOAP function;

FIG. 5 shows an HTML "FORM" tag as provided according to the present invention;

FIG. 6 shows an HTTP header to call a SOAP function;

FIG. 7 shows a sample template for a SOAP request generating instruction in an HTML file; and FIG. 8 shows a result HTML document after the SOAP response has been integrated.

DETAILED DESCRIPTION OF THE INVENTION

Figure 1:
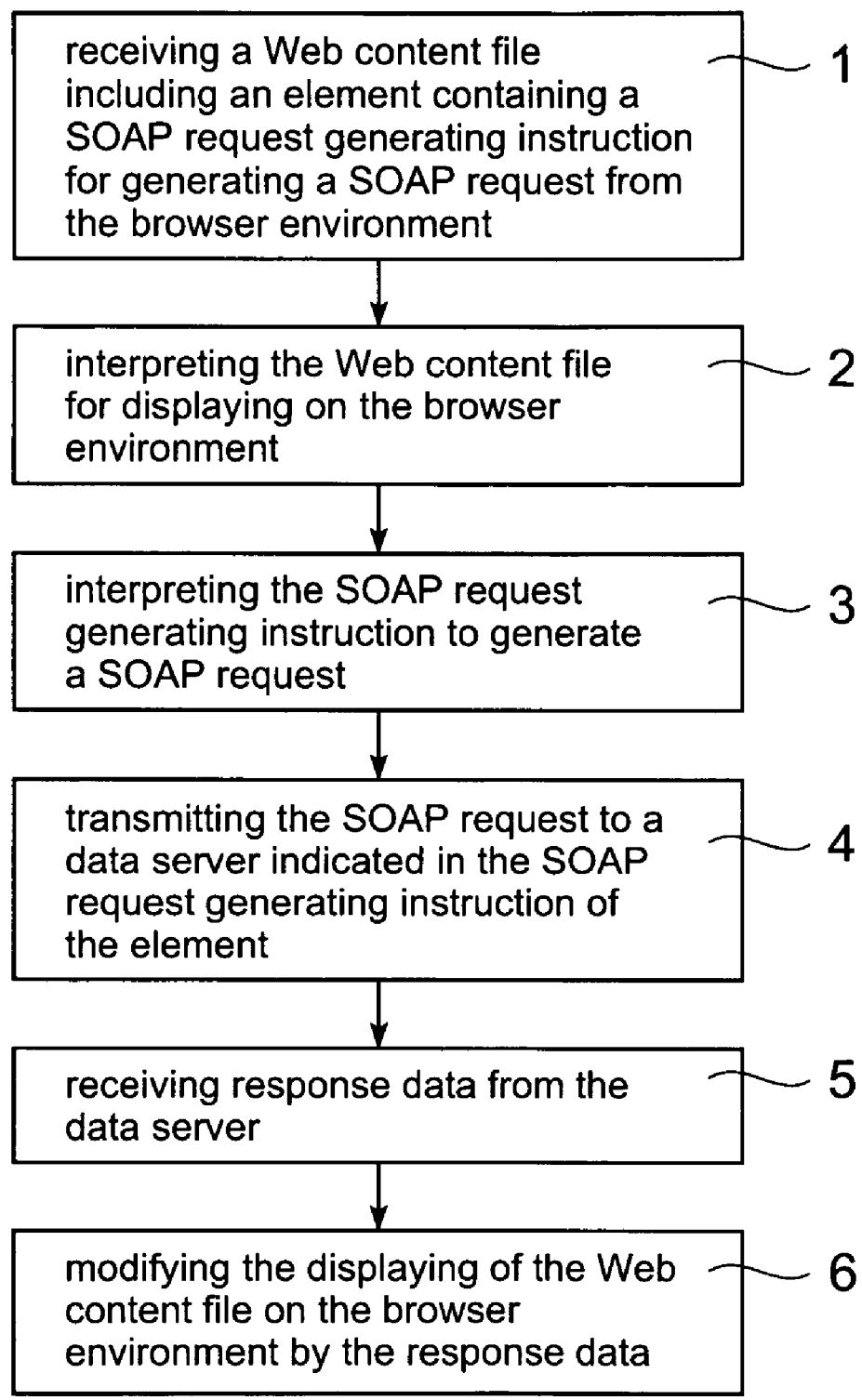
FIG. 1 schematically illustrates operations according to the present invention for integrating browser-incompatible information in a Web content file and for displaying the information on a computing device of a browser environment.

The present invention provides methods, systems and apparatus and a browser environment for integrating browser-incompatible information into Web content and for displaying the information on a computing device of a browser environment. The Web content can be provided by a Web content providing means, as commonly used throughout the world wide Web. Upon receiving a Web content including an element having a remote procedure call (RPC) request generating instruction for generating an RPC request from the browser environment a Web content file is interpreted for displaying on the browser environment. Furthermore, the RPC request generating instruction is interpreted to generate the RPC request. The RPC request is then transmitted to a data server indicated in the RPC request generating instruction of the element. Response data is received from the data server and the displaying of the Web content file is modified on the browser environment by the response data.

A method of the present invention is advantageous because it allows the use of a browser environment on a simple computing or handheld device such as a palm pilot or a cell phone without making use of Java Applets, JavaScript, plug-ins or Active X components. As these elements can hardly be integrated into the simple computing devices because of their need of additional large memory space which usually is not available in these devices, the method of the present invention offers the simple possibility to adapt the browser environment for the simple computing device so that it is able to interpret the Web content file including the RPC request generation instruction.

Preferably, the Web content includes hypertext markup language HTML information. Furthermore, the RPC request generating instruction is a SOAP request generating instruction and the RPC request is generated as a SOAP request.

The SOAP protocol is light weight protocol for exchange of information in a decentralized distributed environment. It is an XML based protocol which consists of three parts: an envelope that defines a framework for describing what is in a message and how to process it, a set of encoding rules for expressing instances of application defined data types, and a convention for representing a remote procedure call and responses.

As the SOAP protocol only consists of three parts, i.e. the envelope that defines the framework for describing what is in the message and how to process it, the set of encoding rules for expressing instances of application defined data types and the convention for representing remote procedure calls and responses, the modification of the browser environment is minor and can easily be integrated into simple computing devices.

Preferably, the SOAP request generating instruction is included in an HTML "FORM" tag in a Web content file having attributes which indicate an URL of the data server and a function being performed at the data server and an encoding type of response data. Thus, the user can generate a SOAP request merely by submitting a form, for example by pressing the submit button on the displayed Web content.

Preferably, by using the "FORM" tag, user defined inputs can be included so that the SOAP request can be generated depending on user inputs on a form on the displayed Web content.

Alternatively, the function being performed at the data server can be provided following a "META" tag of the HTML information which is then extracted and sent as a SOAP request to the data server. In this case, the browser environment has to be modified to interpret the function given following the "META" tag.

The present invention also provides a browser environment having a standard browser computing device for displaying a Web content file is provided. The browser environment further comprises Web content interpreting means for interpreting the Web content file and for displaying it. An RPC request interpreting means is provided for interpreting a remote procedure call (RPC) request generating instruction to generate RPC request data. The RPC request data are transmitted to a data server indicated in the RPC request generating instruction by transmitting means. The result of a function, e.g. a database query, executed at the data server is retrieved by retrieving means wherein the function is indicated in the RPC request generating instruction.

The browser environment of the present invention has the advantage that it is able to generate RPC requests without the need of Java Applets, JavaScript, plug-ins or Active X components which would use a large amount of memory space which is not available in a simple computing device or would involve high costs if integrated in a simple computing device.

Preferably, the browser environment includes a proxy server which is included in the retrieving means and which is able to format and/or modify the RPC response (SOAP response) for displaying as a Web content.

It can be provided that the SOAP request interpreting means is operable to interpret the SOAP request generating instruction wherein the SOAP request generating instruction is included in an HTML "FORM" tag in the Web content file having attributes which indicate an URL of the data server, a function to be performed at the data server, and an encoding type of the response data.

Preferred embodiments of the present invention are now described in more detail in conjunction with the accompanying figures. This invention may, however, be embodied in many different forms and should not be construed as limited to the embodiments set forth herein. Rather, these embodiments are provided so that this disclosure will be thorough and complete and will fully convey the scope of the invention to those skilled in the art.

As will be appreciated by one of skill in the art, the present invention may be embodied as a method and a browser environment. Accordingly, the present invention may take the form of an entirely hardware embodiment, an entirely software embodiment, or an embodiment combining software and hardware aspects. Furthermore, the present invention may take the form of a computer program product on a computer-usable storage medium having computer-usable program code means embodied in the medium.

The present invention is described below with reference to flow chart illustrations of the method. It will be understood that each block of the flow chart illustrations, and combinations of blocks in the flow chart illustrations can be implemented by computer program instructions. These computer program instructions may be provided to a processor of a general purpose computer, a special purpose computer, or other programmable data processing apparatus to produce a machine such that the instructions, which are executed via the processor of the computer or other programmable data processing operators create means for implementing the function specified in the flow chart block or blocks. According to the present invention, the programmable data processing operator is preferably a simple computing device, particularly a portable device which has restrictions in processing power and storage capacity.

In some embodiments, it is provided that the method of the present invention should be loaded on this simple computing device to be executed therein.

Referring to FIG. 1, operations for integrating browser-incompatible information in a Web content file and for displaying the information on a computing device of a browsing environment are illustrated. In a block 1, a Web content file based on a display-oriented protocol, particularly an HTML file is received which includes an element based on a data-oriented protocol comprising at least one SOAP request generating instruction for generating a SOAP request from the browser environment. Thus, the Web content file has a part which is not displayable in the known manner (according to the display-oriented protocol) but does contain a code which cannot be interpreted by the browser environment while the remaining part of the Web content file is being interpreted for displaying it on the browser environment as shown in block 2.

When the Web content file is interpreted, parts which cannot be interpreted by the browser environment are extracted, transmitted to and interpreted by a SOAP request interpreter which is able to generate a SOAP request out of the SOAP request generating instructions contained in the element. This is shown in block 3. After the SOAP request is generated, the SOAP request is transmitted to a data server indicated in the SOAP request generating instruction of the element. This is shown in block 4.

The data server receives the SOAP request and performs a SOAP function which is indicated in the SOAP request and provides a result of the SOAP function which is sent to the browser environment in response. The SOAP function can be of a varying type, for example a database query, a mathematical or logical function, or the like. As shown in block 5, the response data including the function result from the data server is received. The response data is then used in block 6 in order to modify the display of the Web content file on the browser environment. The response data may contain style sheet data to indicate the display format or simply contain additional data to be output.

Figure 2:
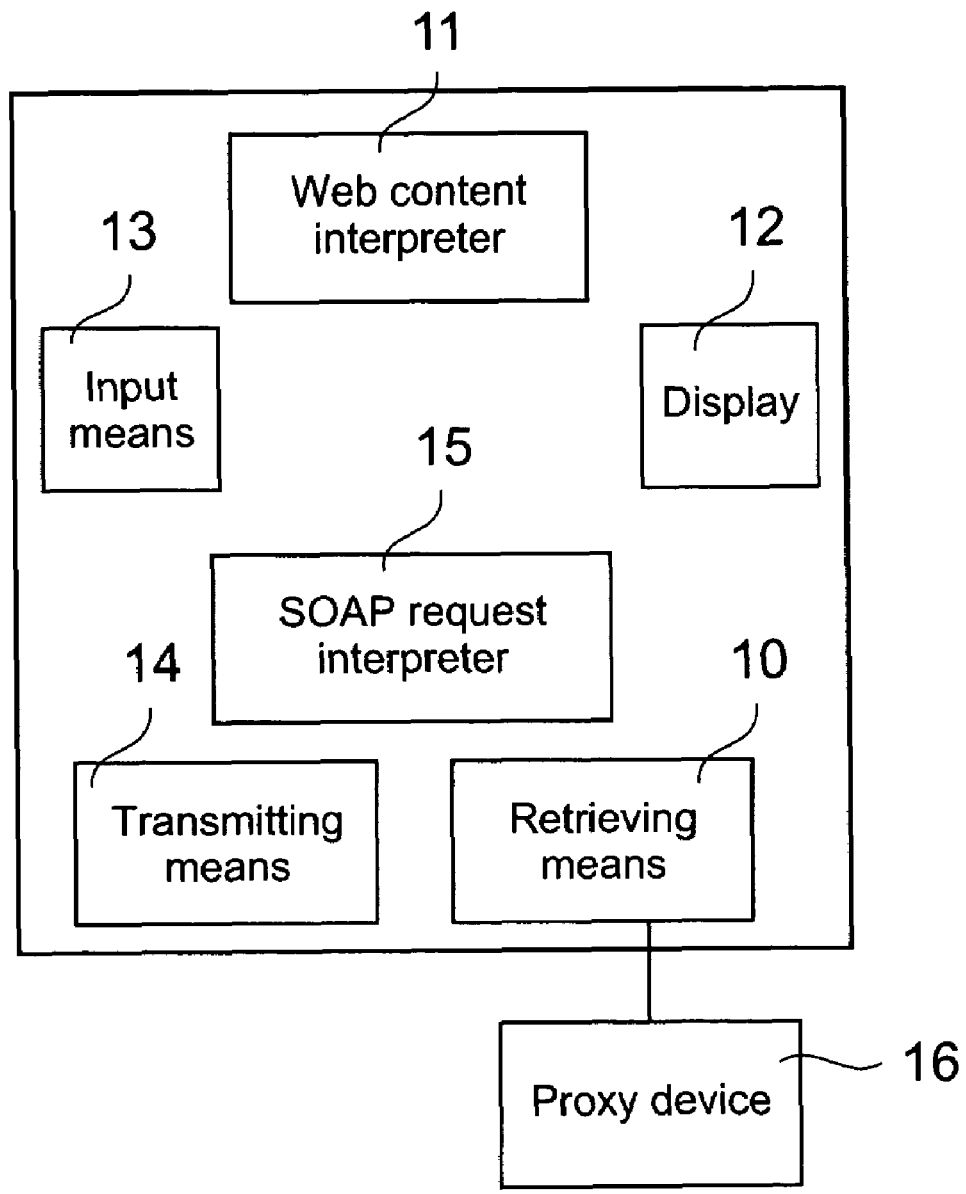
FIG. 2 schematically illustrates a system for carrying out the present invention.

In FIG. 2, an exemplary browser environment is shown. It comprises elements of a standard Web browser environment-like retrieving means 10 to receive Web content file data, for example using the HTTP protocol via the world wide Web. It further comprises a Web content interpreter 11 to analyze the received Web content file and to translate it into a displayable data which is to be displayed on a display 12. Indicated by a user input or the like, which can be input by the input means 13, requests for specific Web content files can be sent via the world wide Web using transmitting means 14.

If the Web content file retrieved by the retrieving means 10 comprises one or more elements which cannot be translated into a displayable content, the information in this element is conventionally omitted by the Web content interpreter, so that no indication of the element is displayed. By the browser environment of the present invention, this element is extracted and separated in the Web content interpreter 11 and addressed to a SOAP request interpreter 15 to find out if the respective element comprises a SOAP request generating information. If there is no SOAP request generating information, no or another type of element handling can be provided. If there is a SOAP request generating instruction included in the element, the SOAP request interpreter 15 analyzes the instruction and generates a SOAP request which is then transmitted by the transmitting means 14 to a data server the address of which is indicated within the SOAP request generating instructions.

The browser environment according to the present invention also comprises a mechanism for maintaining a synchronization between the Web content file (HTML file) and the received SOAP response from the data server which should be included into the displayable information given by the Web content file. This can be a proxy device 16 included in the communication path between the data server and the retrieving means of the browser environment. Alternatively, a SOAP response interpreter can be provided, as well.

To call a SOAP function in the data server, the SOAP request should comply with a specific format given in the example of FIG. 3. Therein, the SOAP protocol is shown which imposes that some new HTTP headers are set to comply with the protocol. It is the case of the header called SOAP action that should be set to the URL of the service followed by the name of the method being called.

Today, only a very limited way by which HTML can affect the http header values in the current specification of HTML exists. There are two HTML components that are related to http.
1. The "FORM" elements using the "POST" method. The author can specify the content type of the request sent thanks to the attribute enctype: This sets the content type header of the HTTP message. However the possible values for this attribute are limited to "multipart/form/data", "application/X-www-form-URL-encoded" and "text/plain".
2. The "META" tag can be followed by a directive called http_equiv, which is used to said HTTP field in response to the query.

Neither of these is capable of setting the header components necessary for a SOAP message.

If using the "POST" method, a further problem exists which is the format used by the "POST" method to send the data via the Internet. Neither of the available formats can be used to generate a SOAP message so that no mechanism is available to send a suitable format SOAP request from within a browser session.

Furthermore, a standard browser environment has no means included to receive SOAP responses and to integrate the information contained therein to the displaying of the Web content file. Even if the content type of the response allows a Web browser to recognize a SOAP message as such, no easy way of passing the SOAP message, receiving the result codes and generating a suitable output display for the user exist.

An example SOAP response is given in FIG. 4. The payload is XML-formatted and needs to be transformed into something that a Web browser can render. In order to enable a standard browser environment to generate SOAP requests and to embed SOAP response data into the displaying of the Web content, it is provided that additional attributes within the HTML "FORM" tag and an additional proxy function that is either implemented inside the browser environment or as a stand-alone component somewhere in the communication path between the browser and the server. It intercepts messages generated by the browser and applies two steps:
generation of the actual SOAP request including headers and the exact SOAP format and
generation of markup content based on the SOAP response.

The method according to the present invention uses additional attributes within the common HTML "FORM" tag to define the necessary parameters for generating a valid SOAP request. For the header fields, two additional fields are added: the field encoding type "enctype" which is typically "text/XML" and the field "SOAPaction" which identifies the method that is to be executed. An example is given in the HTML "form" tag as shown in FIG. 5.

Consequently, having those attributes available in the HTML information, one can rely on the proxy to create an HTTP header of the form given in FIG. 6.

It is proposed to use a SOAP template that defines the precise format of the SOAP request that is to be generated through this form. A sample template is shown in FIG. 7, which requests temperature by a weather service.

Such a template may of course be encoded with the HTML page of preferably referenced within the "FORM" tag as yet another additional attribute, for instance as the field <Regtemplate="template-url">. In the template, no value is provided for the parameter "zip". This place holder will be filled when the user has filled the form and wants to submit it using a SOAP submit button. The input name for each parameter to be filled by the user should have the same name as the place holder in the SOAP template so that the Web browser can know where to plug each value. For example, the GUI component that asks the user which zip code they want to look up should look like: <input type="text" name="zip">.

When the Web browser receives the SOAP response, it should display the relevant content to the end user. For example, a style sheet is used for this purpose. For example, an XML style sheet would be applied to the SOAP response to identify which part of the XML SOAP message should be displayed on the screen. The style sheet could be applied on the server side within the proxy or within the browser. With a response for a weather service as mentioned earlier, for example, the resulting HTML content would look as indicated in FIG. 8. The style sheet may be included in the requesting HTML sheet or referenced within the "FORM" tag by the field "soapstyle=url_to_xsl", as an example.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention.

The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method of integrating browser-incompatible information in a Web content file and displaying the information on a computing device of a browser environment without making use of Java Applets, JavaScript, plug-ins or ActiveX components, comprising:
   receiving at the browser environment the Web content file that comprises at least an element having a remote procedure call (RPC) request generating instruction for generating an RPC request from the browser environment, the RPC request generating instruction that is browser-incompatible information;
   interpreting at the browser environment the Web content file for displaying on the browser environment;
   separating the RPC request generating instruction that is browser-incompatible information at the browser environment, wherein the RPC request generating instruction is embedded in an existing tag which is part of a display-oriented protocol used in the web content file;
   interpreting at the browser environment the RPC request generating instruction to generate the RPC request;
   transmitting from the browser environment the RPC request to a data server indicated in the RPC request generating instruction of the element;
   receiving response data from the data server; and
   modifying the displaying of the Web content file on the browser environment based on the response data.

2. A method according to claim 1, wherein the Web content file further comprises HyperText Markup Language (HTML) information.

3. A method according to claim 1, wherein the RPC request generating instruction is a SOAP request generating instruction and the SOAP request is generated as a SOAP request.

4. A method according to claim 3, wherein the SOAP request generating instruction is included in an HTML "FORM" tag in the Web content file having attributes which indicate a URL of the data server, a function performable at the data server, and an encoding type of the response data.

5. A method according to claim 4, wherein the HTML "FORM" tag comprises user defined inputs to include user inputs in the SOAP request.

6. A method according to claim 4, wherein the function performable at the data server is provided following a "META" tag of the HTML information.

7. A program storage device readable by machine, tangibly embodying a program of instructions executable by the machine to perform method steps for integrating browser-incompatible information in a Web content file, said method steps comprising the steps of claim 1.

8. The method of claim 1, wherein the computing device of the browser-environment includes a hand held device.

9. The method according to claim 1, wherein the RPC request generating instruction is a SOAP request generating instruction and the SOAP request is generated in SOAP format the SOAP format including at least an envelope that defines a framework for describing what is in a message and how to process it and a transport header, and wherein the existing tag is an HTML "FORM" tag that embeds the SOAP request generating instruction, the HTML "FORM" tag further including attributes which indicate a URL of the data server, a function performable at the data server, an encoding type of the response data, and user defined inputs to include user inputs in the SOAP request.

10. A browser environment having a browser computing device for displaying a Web content file comprising:
one or more processors;
Web content interpreting means for interpreting the Web content file, the Web content file including at least a remote procedure call (RPC) request generating instruction that is browser-incompatible information, the Web content interpreting means separating the RPC request generating instruction that is browser-incompatible information at the browser environment, wherein the RPC request generating instruction is embedded in an existing tag which is part of a display-oriented protocol used in the web content file;
RPC request interpreting means for interpreting the remote procedure call (RPC) request generating instruction in the Web content file to generate RPC request data;
transmitting means to transmit the RPC request data to a data server indicated in the RPC request generating instruction; and
retrieving means for retrieving a result of a function executed at the data server, wherein the function is indicated in the RPC request generating instruction,
wherein the browser-incompatible information is displayed on a computing device of the browser environment without making use of Java Applets, JavaScript, plug-ins or ActiveX components.

11. The browser environment according to claim 10, wherein the RPC request interpreting means is a SOAP request interpreting means, wherein the RPC request generating instruction is a SOAP request generating instruction and a SOAP request is generated.

12. The browser environment according to claim 11, wherein the Web content file includes HyperText Markup Language (HTML) information.

13. The browser environment according to claim 12, wherein the SOAP request interpreting means is included in a plugin for the browser environment.

14. The browser environment according to claim 12, wherein a proxy server is provided connected to the browser computing device and to integrate response data into the Web content file.

15. The browser environment according to claim 12, wherein the SOAP request interpreting means is operable to interpret the SOAP request generating instruction, wherein the SOAP request generating instruction is included in an HTML "FORM" tag in the Web content file having attributes which indicate a URL of the data server, a function to be performed at the data server and an encoding type of the response data.

16. The browser environment according to claim 12, wherein the SOAP request interpreting means is operable to interpret the SOAP request generating instruction, wherein an information about a function being performed at the data server of the SOAP request generating instruction is provided following a "META" tag of the Web content file.

17. The browser environment according to claim 11, wherein the Web content file includes HyperText Markup Language (HTML) information.

18. An article of manufacture comprising a computer usable medium having computer readable program code means embodied therein for causing integration, the computer readable program code means in said article of manufacture comprising computer readable program code means for causing a computer to effect the steps of:
integrating browser-incompatible information in a Web content file and displaying the information on a computing device of a browser environment without making use of Java Applets, JavaScript, plug-ins or ActiveX components, wherein a Web content providing means is capable of providing the Web content file, the step of integrating comprising the steps of:
receiving at the browser environment the Web content file that comprises at least an element having a remote procedure call (RPC) request generating instruction for generating an RPC request from the browser environment, the RPC request generating instruction that is browser-incompatible information;
interpreting at the browser environment the Web content file for displaying on the browser environment;
separating the RPC request generating instruction that is browser-incompatible information at the browser environment, wherein the RPC request generating instruction is embedded in an existing tag which is part of a display-oriented protocol used in the web content file;
interpreting at the browser environment the RPC request generating instruction to generate the RPC request;
transmitting from the browser environment the RPC request to a data server indicated in the RPC request generating instruction of the element;
receiving response data from the data server; and
modifying the displaying of the Web content file on the browser environment based on the response data.

* * * * *